(12) United States Patent
Veronie et al.

(10) Patent No.: US 9,061,697 B2
(45) Date of Patent: Jun. 23, 2015

(54) TRANSPORTATION DOLLIES

(71) Applicants: Daniel Lee Veronie, Youngsville, LA (US); Kenneth Bruce Mitchell, Fort Worth, TX (US)

(72) Inventors: Daniel Lee Veronie, Youngsville, LA (US); Kenneth Bruce Mitchell, Fort Worth, TX (US)

( * ) Notice: Subject to any disclaimer, the term of this patent is extended or adjusted under 35 U.S.C. 154(b) by 0 days.

(21) Appl. No.: 14/209,126

(22) Filed: Mar. 13, 2014

(65) Prior Publication Data

US 2014/0300070 A1 Oct. 9, 2014

Related U.S. Application Data

(60) Provisional application No. 61/810,081, filed on Apr. 9, 2013.

(51) Int. Cl.
*B62B 1/10* (2006.01)
*B62B 3/10* (2006.01)

(52) U.S. Cl.
CPC .......................................... *B62B 3/10* (2013.01)

(58) Field of Classification Search
CPC .......... B62B 1/26; B62B 1/262; B62B 1/264; B62B 3/002; B62B 3/008; B62B 3/04; B62B 3/10; B62B 3/102; B62B 3/104; B62B 5/0083; B62B 5/0093
USPC ........ 280/79.11, 79.3, 79.5, 79.6, 400, 411.1, 280/480, 49.6
See application file for complete search history.

(56) References Cited

U.S. PATENT DOCUMENTS

| 1,515,824 | A | * | 11/1924 | Best | 242/557 |
| 2,851,235 | A | * | 9/1958 | Henig | 410/44 |
| 4,002,352 | A | * | 1/1977 | Hager | 280/408 |
| 5,037,118 | A | * | 8/1991 | Straube | 280/79.6 |
| 5,180,178 | A | * | 1/1993 | Caceres | 280/47.34 |
| 5,219,175 | A | * | 6/1993 | Woelfel | 280/47.131 |
| 2014/0125023 | A1 | * | 5/2014 | Cook et al. | 280/79.6 |

* cited by examiner

*Primary Examiner* — John Walters

(57) ABSTRACT

A transportation dolly for transporting tools, such as Measurement While Drilling (MWD) tools, is provided. The dolly includes a base plate with a front end, a rear end, a top surface, and a bottom surface. A plurality of wheels may be attached to the bottom surface. A cradle forming a channel within may be attached to the top surface. A plurality of dollies may be linked together. The channel may be shaped and sized to receive the MWD tool. Therefore, the MWD tool may be strapped to the plurality of dollies and transported in a safe manner.

9 Claims, 5 Drawing Sheets

TRANSPORTATION DOLLIES

CROSS-REFERENCE TO RELATED APPLICATION

This application claims the benefit of priority of U.S. provisional application No. 61/810,081, filed Apr. 9, 2013, the contents of which are herein incorporated by reference.

BACKGROUND OF THE INVENTION

The present invention relates to transportation dollies and, more particularly, to transportation dollies for transporting tools.

When carrying Measurement While Drilling (MWD) tools across locations, personal injury is a high risk. The tool is not being stabilized, making transportation unstable. Currently, dangerous practices of transporting MWD tools may include multiple workers carrying the MWD tools on their shoulders across location. Some of the tools are approximately 28'-32' long and weigh between 200-225 lbs. The physical labor required when manually transporting MWD tools puts abnormal distribution of weight on the back, neck and shoulders and may cause serious injury to the workers.

As can be seen, there is a need for a device for safely transporting the MWD tools.

SUMMARY OF THE INVENTION

In one aspect of the present invention, a transportation dolly comprises: a base plate comprising a front end, a rear end, a top surface and a bottom surface; a plurality of wheels extending from the bottom surface of the base plate; and a cradle forming a channel within, wherein the cradle is on the top surface of the base plate, wherein the length of the channel extends in a direction from the front end to the rear end, wherein the width of the channel is substantially smaller than at least a portion of the width of the base plate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a transportation dolly for transporting tools, such as Measurement While Drilling (MWD) tools. The dolly includes a base plate with a front end, a rear end, a top surface, and a bottom surface. A plurality of wheels may be attached to the bottom surface. A cradle forming a channel within may be attached to the top surface. A plurality of dollies may be linked together. The channel may be shaped and sized to receive the MWD tool. Therefore, the MWD tool may be secured to the plurality of dollies and transported in a safe manner.

Figure 1:
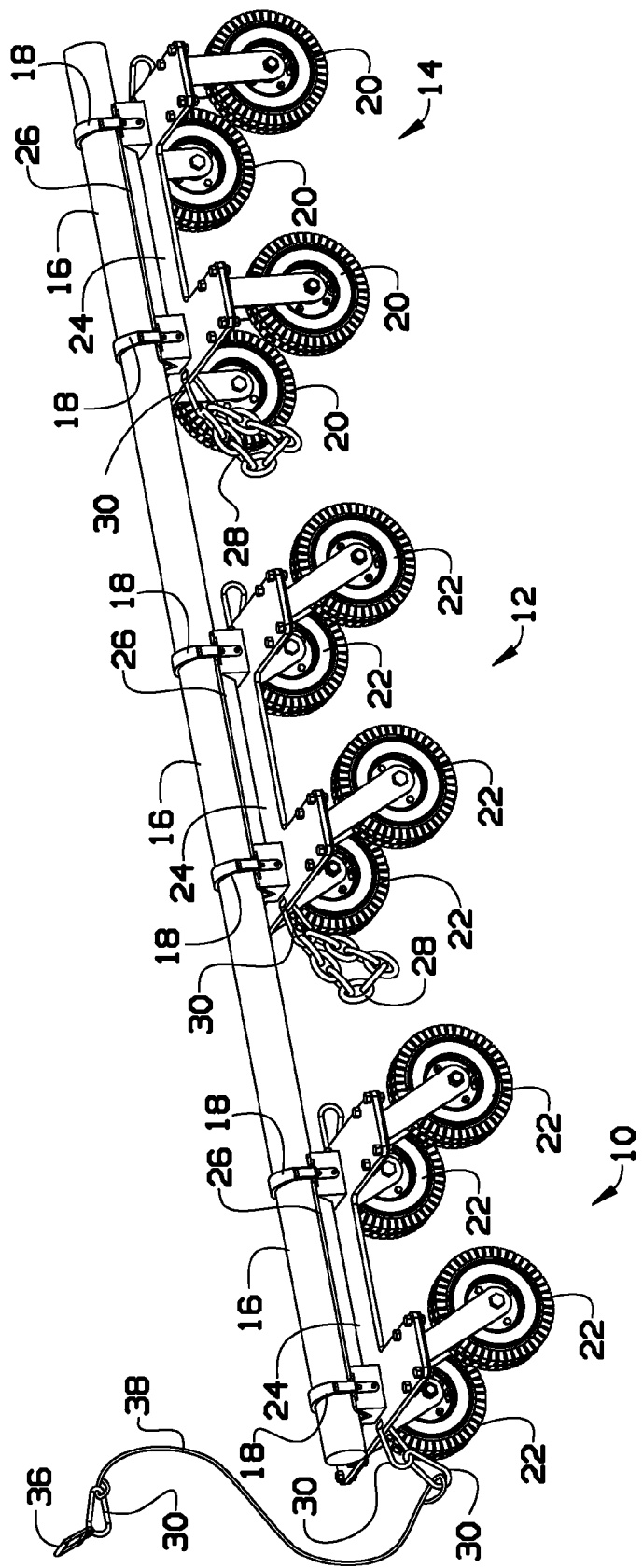
FIG. 1 is a perspective view of the present invention shown in use.
Figure 2:
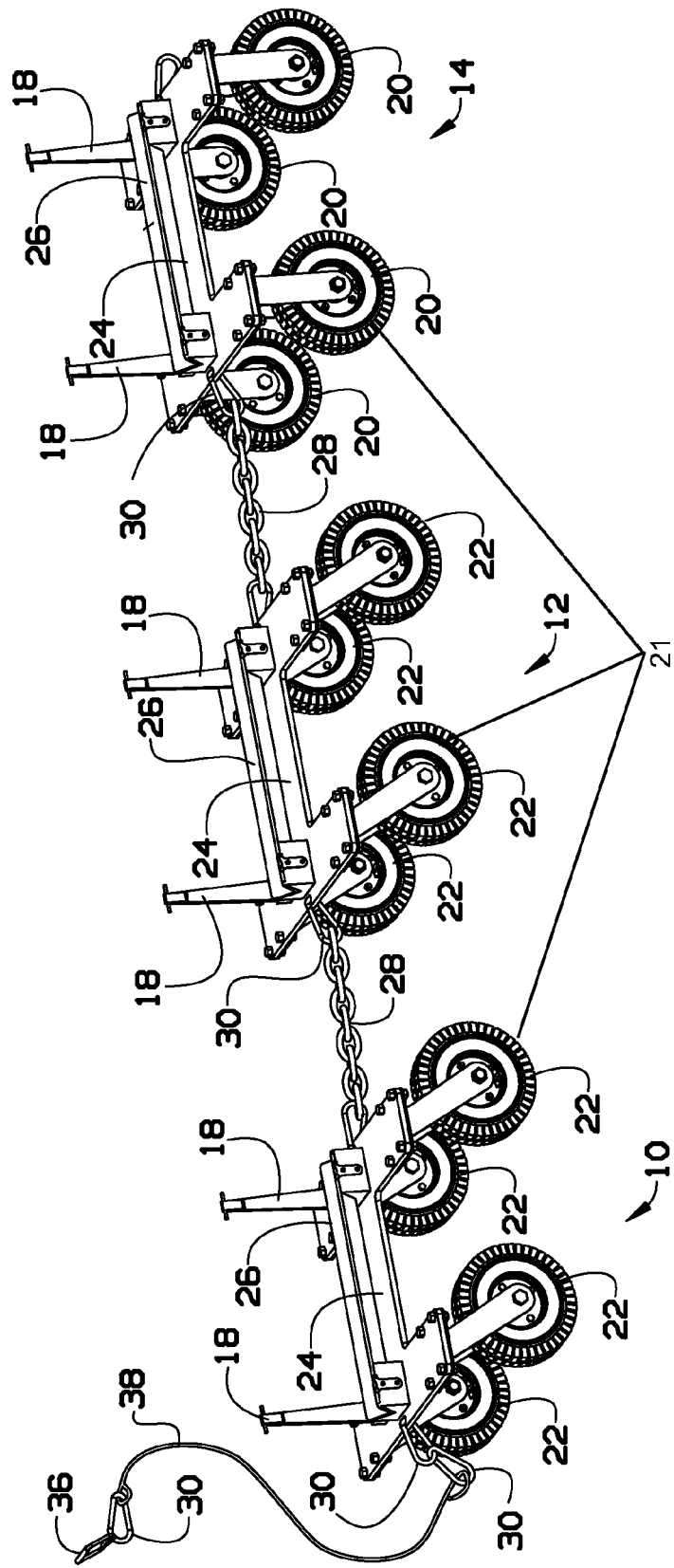
FIG. 2 is a perspective view of the present invention shown in use without the exemplary MWD tool.
Figure 3:
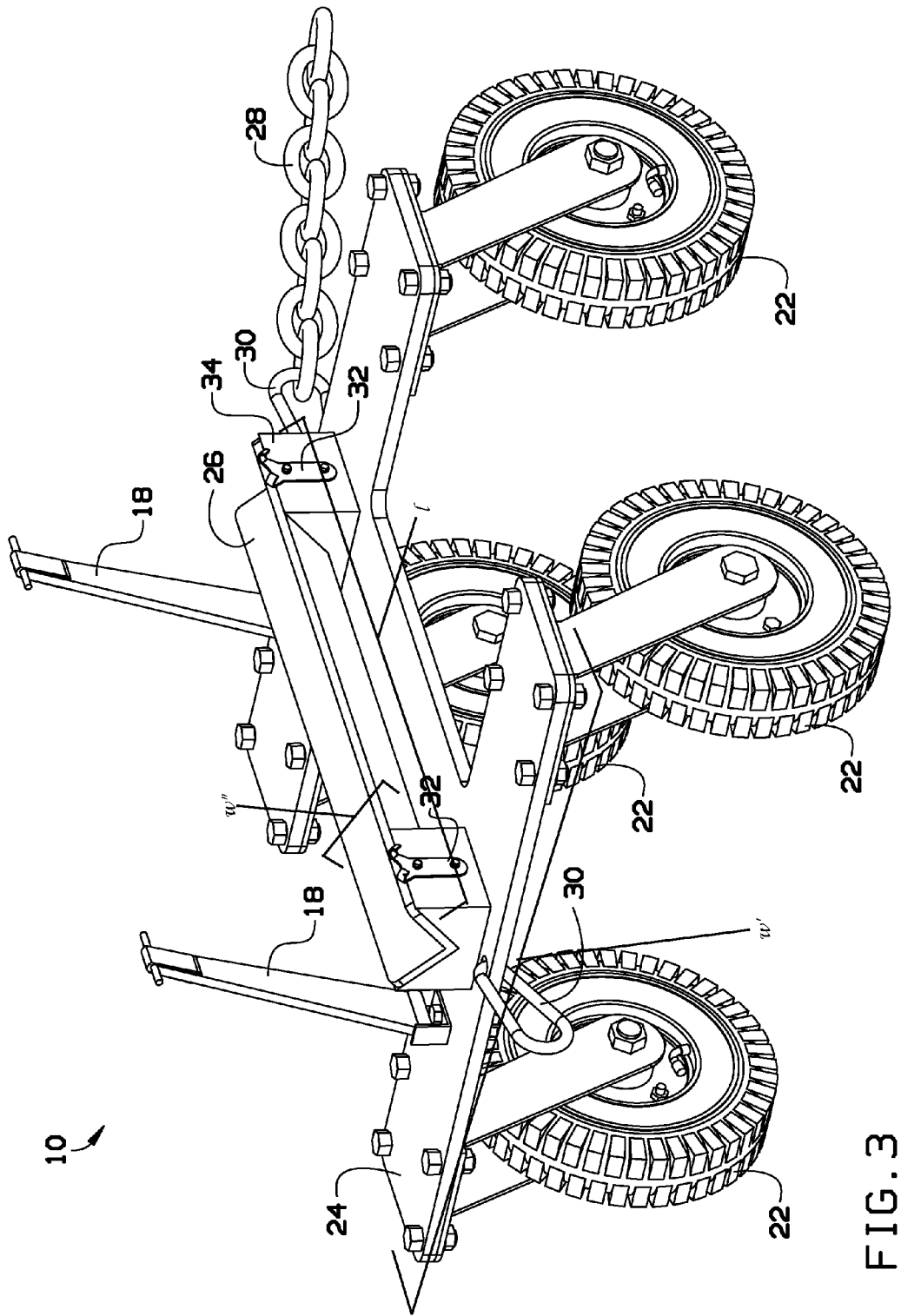
FIG. 3 is a perspective view of the lead dolly of the present invention.
Figure 4:
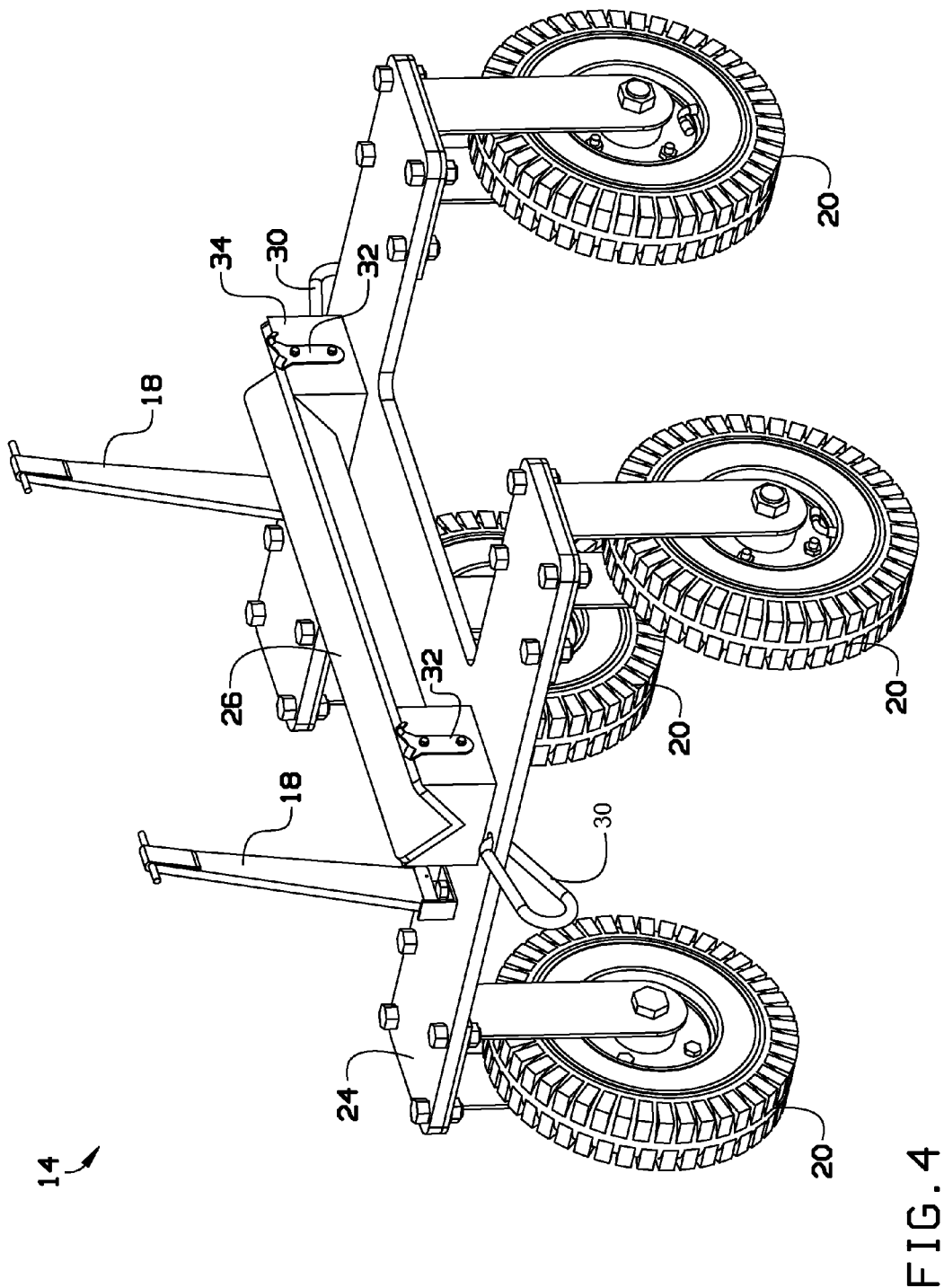
FIG. 4 is a perspective view of the rear dolly of the present invention.
Figure 5:
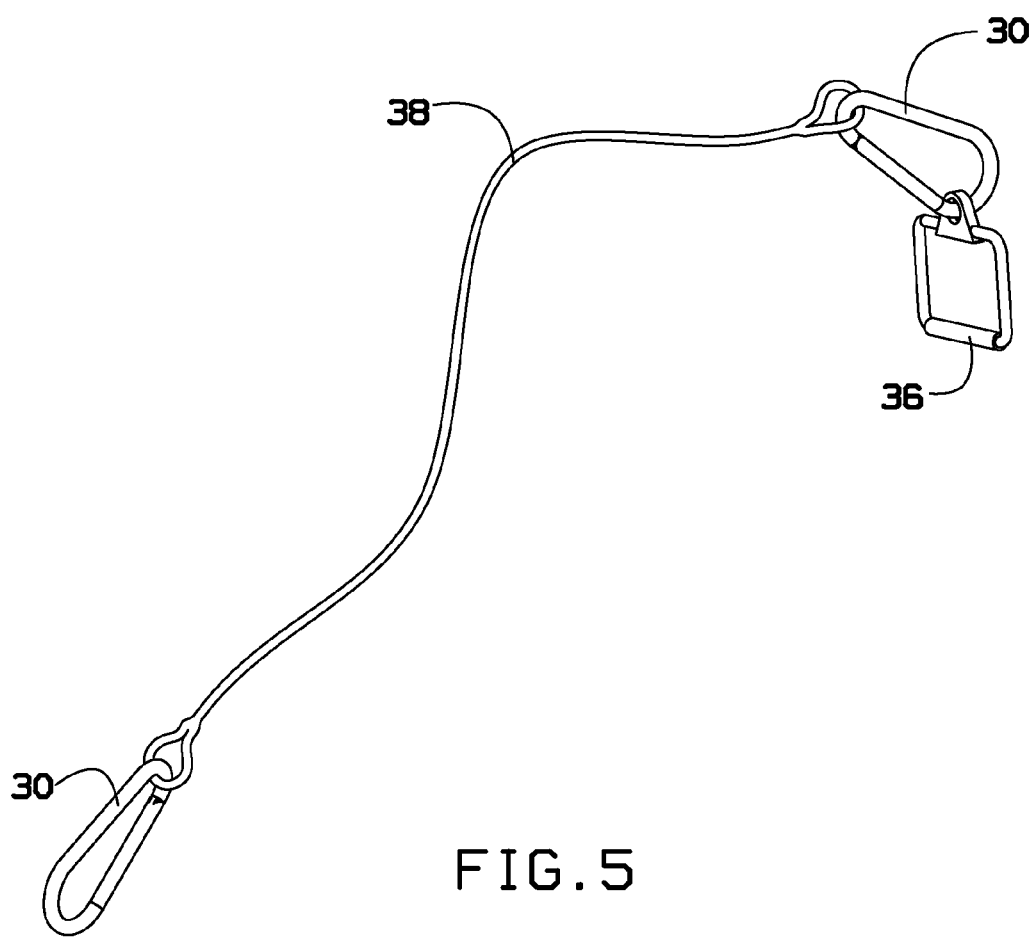
FIG. 5 is a perspective view of the tow rope and the handle of the present invention.

Referring to the FIGS. 1 through 5, the present invention may include at least one transportation dolly 10. The transportation dolly 10 may include a base plate 24 with a front end, a rear end, a top surface and a bottom surface. The present invention may further include a plurality of wheels 21 extending from the bottom surface of the base plate 24. The present invention may further include a cradle 26 forming a channel within. The cradle 26 may be on to the top surface of the base plate 24. The base plate 24 of the present invention may include an H-shape having four corners and a middle portion. Each corner may include a wheel 21 and the cradle 26 may extend along the middle portion. The length (l) of the channel extends in a direction from the front end to the rear end of the base plate 24. The width (w") of the channel may be substantially smaller than at least a portion of the width (w') of the base plate 24.

The cradle 26 of the present invention may be sized and shaped to secure a MWD tool 16 within the channel. In certain embodiments of the cradle 26 of the present invention may include a V-shaped cross section along the length (l) of the cradle 26. At least one support block 34, such as two support blocks 34, may be attached to the top surface of the base plate 24 and may support the cradle 26. In certain embodiments, the cradle 26 may include a first open end near the front end of the base plate 24 and a second open end near the rear end of the base plate 24. Therefore, the MWD tool 16 may rest within the channel and extend past the transportation dollies 10.

In certain embodiments, the present invention may further include a device to secure the MWD tool 16 within the channel. The device may include a strap 18 connected to the dolly 10 on a first side of the cradle 26, and a strap connector 32 connected to the dolly 10 on a second side of the cradle 26. In certain embodiments, the strap 18 may be connected to the base plate 24 and the strap connector 32 may be attached to the support block 34. In certain embodiments, each dolly 10 may include a first strap 18 attachable to a first strap connector 32 near the first open end of cradle 26, and a second strap 18 attachable to a second strap connector 32 near the second open end of the cradle 26. After the MWD tool 16 has been placed within the channel, the strap 18 may be releasably attached to the strap connector 32, covering at least a portion of the channel, and thereby securing the MWD tool 16 within the channel.

The present invention may include a plurality of dollies 10 attached together for transportation. In such embodiments, each dolly 10 may include a first connector link 30 attached to the front end of the base plate 24 and a second connector link 30 attached to the second end of the base plate 24. In certain embodiments, the present invention may include a lead dolly 10, a middle dolly 12 attached to the lead dolly 10, and a rear dolly 14 attached to the middle dolly 12. A chain 28 may attach the second connector link 30 of the lead dolly 10 with the first connector link of the middle dolly 12, and a chain 28 may attach the second connector link 30 of the middle dolly 12 to the first connector link 30 of the rear dolly 14.

In certain embodiments, a handle 36 may be attached to the first connector link 30 of the lead dolly 10' by a rope 38. The handle 36 may be used to grasp the linked dollies 10', 12, 14 and transport the MWD tool 16 secured within the cradles 26. Therefore, the linked dollies 10', 12, 14 may easily be pulled and maneuvered. To further add to the maneuverability of the dollies 10', 12, 14, the lead dolly 10' and the middle dolly 12 may include a plurality of swivel wheels 22, and the rear dolly 14 may include a plurality of fixed wheels 20. Therefore, the linked dollies 10', 12, 14 may be able to make easier turns.

The wheels 21 of the present invention may endure outdoor elements that may present transportation challenges with a load rating of 300 lbs. per wheel 21, with accumulated rating of 1,200 lbs. per dolly 10. The swivel wheels 22 may include a 360 degree swivel to navigate any direction. The H-shaped base plate 24 may be used to accommodate the wheels 21, for load distribution and minimize overall weight of the dolly 10. The fixed wheels 20 may be used so the rear dolly 14 may act as the pendulum.

In certain embodiments, the present invention may be used during the build and deployment process, and the MWD tool may never touch the ground. The maneuverability of the dollies gives a user a 360 degree turning radius to navigate through tight spots around location. A low center of gravity may make the dollies a cohesive unit when towing MWD tool across a location. The pneumatic wheels may handle whatever terrain or inclement weather a user may encounter while on location. In certain embodiments, the wheels may also include grease nipples for proper maintenance. The present invention may be designed to be transported in a standard MWD kit box. All components may be replaceable. The present invention may eliminate valuable time required from hands on location to come down off of a rig floor and carry tool across a location. The present invention may become a vital addition to PPE for MWD Engineers.

The 6061 high grade ⅜ inch aluminum may be used for strength and durability. The present invention may include a 20×20 frame that may be used to accommodate 360 degree pneumatic wheel spacing. The H-shape pattern may minimize overall weight of each individual dolly, while maintaining maximum weight distribution. 6061 grade 2 inch by 2 inch by ¼ inch angle iron and 3 inch by 3 inch by ¼ inch square tubing may be used for durability and strength. The 8 inch swivel and rigid pneumatic wheels may be used for environmental concerns due to inclement weather along with various rig location surfaces. Hood latches may be used for adjustability and quick attachment. The tow rope may be mildew resistant, UV resistant, may have a tensile strength of 7400 lbs, and may be pre manufactured with bridles at each end. The handle may be used due to the pre designed pulling motion when used in a work out facility. Spring links and chain links may be used for the correct spacing when all dollies are towed in the train formation. The spring link load capacity may be 400 lbs., which may exceed any pulling load capacity of MWD tools when being transported. The hardware used may be made for durability and rust prevention.

The following steps may be taken to create a complete set of dollies: cut pattern and drill holes on aluminum plate to specs; cut aluminum angle iron and aluminum square tubing to specs; drill holes through square tubing to specs; soft pad all aluminum parts for shine finish and all corners are to be rounded; weld aluminum parts to specs; clean all welds. Buff soot, remove buckshot and soft pad flush welds on top of angle iron; attach wheels and rubber latch kits to specs; cut and apply grip tape to specs.

In certain embodiments, the designed support height of the dollies may match the industry standard jack stand of 12 and ¼ inches from ground level for the tools resting point. Typically when a MWD tool is built prior to deployment 4-6 jack stands are used for support during build. Essentially the three dollies may become jack stands while building the tool. For example, when making a tool for a Gamma job, three dollies and three jack stands may be used. When the tool has been completed and ready for deployment the tool may be strapped down with the rubber straps, the jack stands may be removed, and the MWD tool may be pulled to a desired deployment location. Once the desired deployment location has been reached, unlatch the MWD tool, connect to hoist line to the lifting apparatus, and lift right off the dollies to the rig floor. After the tool has been deployed the three dollies may be connected using the supplied spring links and chain links in a train configuration to tow back to desired location.

When a tool is pulled out of the hole and ready to be laid down the three dollies may be lined up to a desired spacing, the tool may be lowered into its angle iron resting point of the three dollies. The tool may be strapped down with the straps and towed back to desired location. In a wire line situation involving a tool swap, a new tool may be strapped down on the MWD dolly's angle iron resting point. When the old tool comes out of the hole, the tools may be rested on either side of the H-shaped based plate. The lifting apparatus may be swapped over to the new tool and then deployed. The old tool may be moved from resting on the H-shaped based plate into the dolly's angle iron resting point. The tool may be latched and towed back to desired location. The dollies of the present invention may also be used to transport wire line retrieval gear.

It should be understood, of course, that the foregoing relates to exemplary embodiments of the invention and that modifications may be made without departing from the spirit and scope of the invention as set forth in the following claims.

What is claimed is:

1. A transportation dolly comprising:
   a base plate comprising a front end, a rear end, a top surface and a bottom surface;
   a plurality of wheels extending from the bottom surface of the base plate;
   a cradle forming a channel within, wherein the cradle is on the top surface of the base plate, wherein a length of the channel extends in a direction from the front end to the rear end, wherein a width of the channel is substantially smaller than at least a portion of a width of the base plate; and
   a strap connected to the dolly on a first side of the cradle, and a strap connector connected to the dolly on a second side of the cradle, wherein the strap is configured to releasably attach to the strap connector and cover at least a portion of the channel.

2. The transportation dolly of claim 1, wherein a cross section along a length of the cradle is V-shaped, and wherein the cradle comprises a first open end and a second open end.

3. The transportation dolly of claim 1, further comprising a first strap and a first strap connector connected near the first open end of cradle, and a second strap and a second strap connector connected near the second open end of the cradle.

4. The transportation dolly of claim 1, further comprising a first connector link attached to the front end of the base plate and a second connector link attached to the rear end of the base plate.

5. The transportation dolly of claim 4, further comprising a lead dolly, a middle dolly attached to the lead dolly, and a rear dolly attached to the middle dolly.

6. The transportation dolly of claim 5, wherein the lead dolly comprises a plurality of swivel wheels, the middle dolly comprises a plurality of swivel wheels and the rear dolly comprises a plurality of fixed wheels.

7. The transportation dolly of claim 6, a handle attached to the first connector link of the lead dolly by a rope.

8. The transportation dolly of claim 1, further comprising at least one support block attached to the top surface of the base and supporting the cradle.

9. The transportation dolly of claim 1, wherein the base plate comprises an H-shape comprising four corners and a middle portion, wherein each corner comprises a wheel and the cradle extends along the middle portion.

* * * * *